Aug. 2, 1938.　　　V. E. PRATT ET AL　　　2,125,582
PROJECTION DEVICE
Filed Nov. 18, 1936　　　9 Sheets-Sheet 1

INVENTORS
VERNEUR E. PRATT
BY ZOLTAN TAKATS
ATTORNEY

Aug. 2, 1938.   V. E. PRATT ET AL   2,125,582
PROJECTION DEVICE
Filed Nov. 18, 1936   9 Sheets-Sheet 2
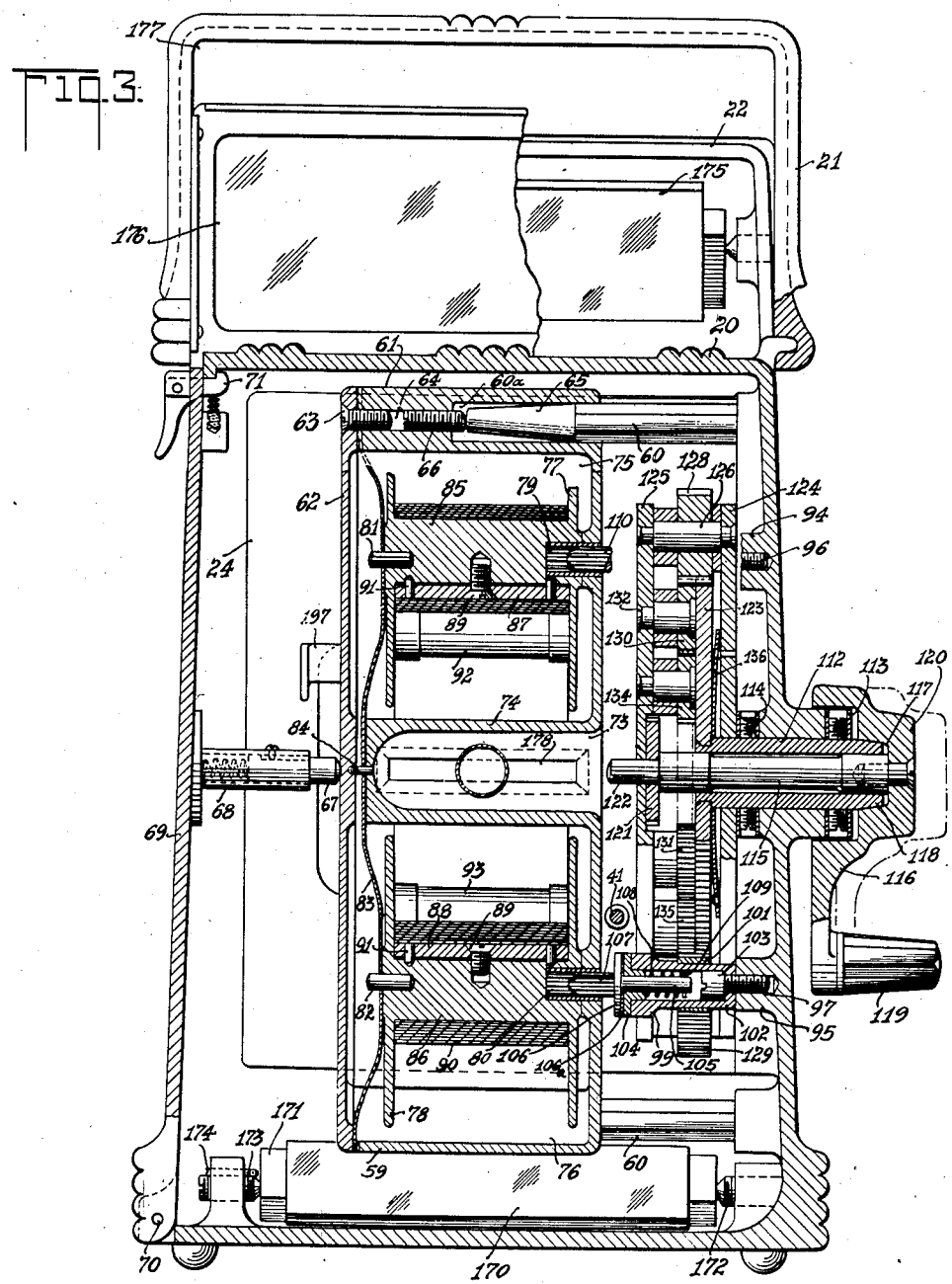
INVENTORS
VERNEUR E. PRATT
ZOLTAN TAKATS
BY
ATTORNEY

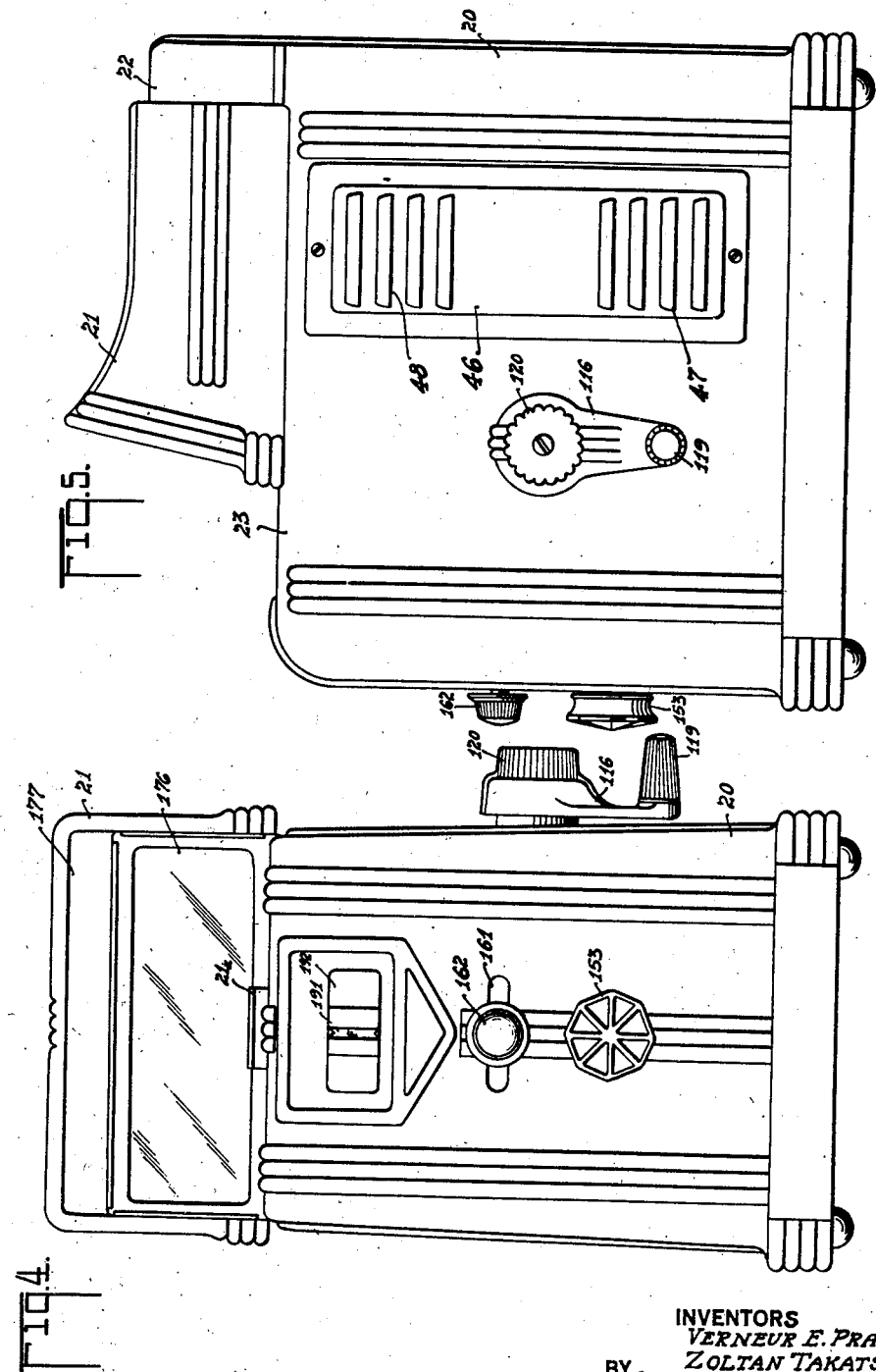

Aug. 2, 1938.  V. E. PRATT ET AL  2,125,582
PROJECTION DEVICE
Filed Nov. 18, 1936  9 Sheets-Sheet 4
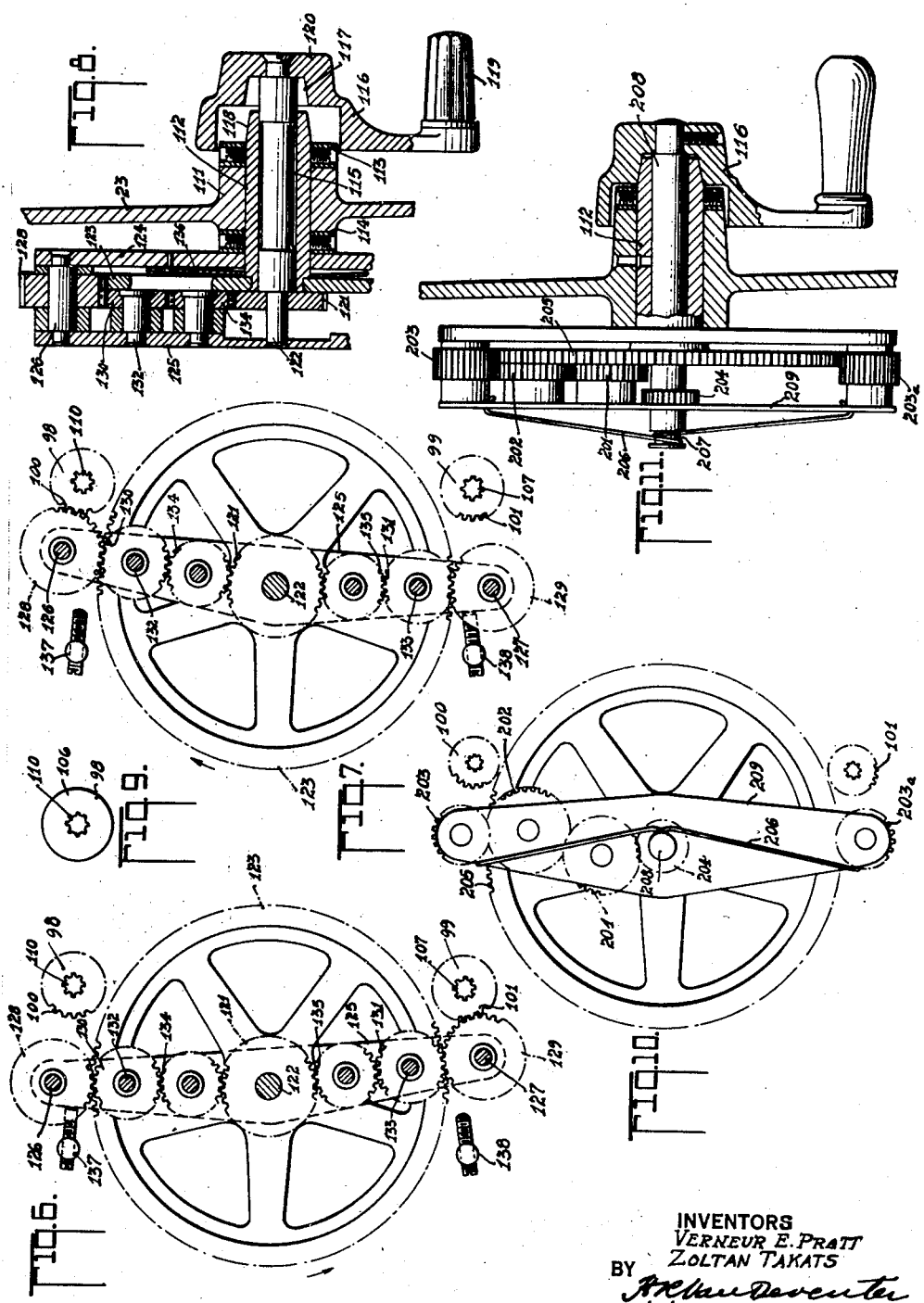
INVENTORS
VERNEUR E. PRATT
ZOLTAN TAKATS
BY
ATTORNEY Aug. 2, 1938.   V. E. PRATT ET AL   2,125,582
PROJECTION DEVICE
Filed Nov. 18, 1936   9 Sheets-Sheet 5
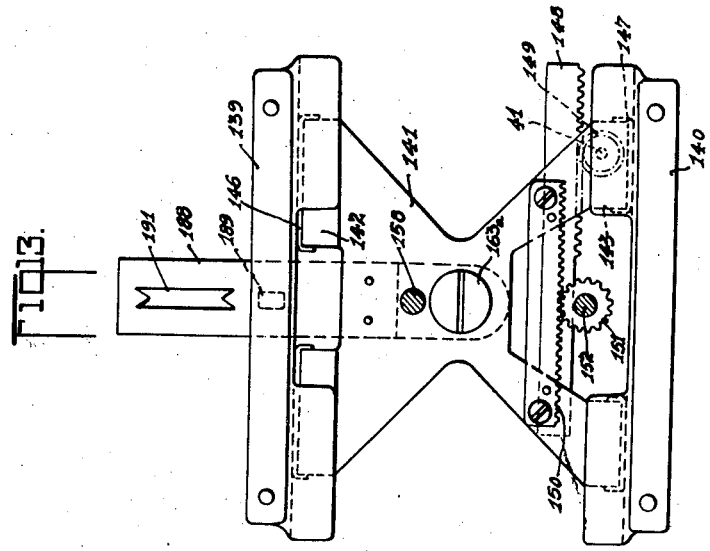
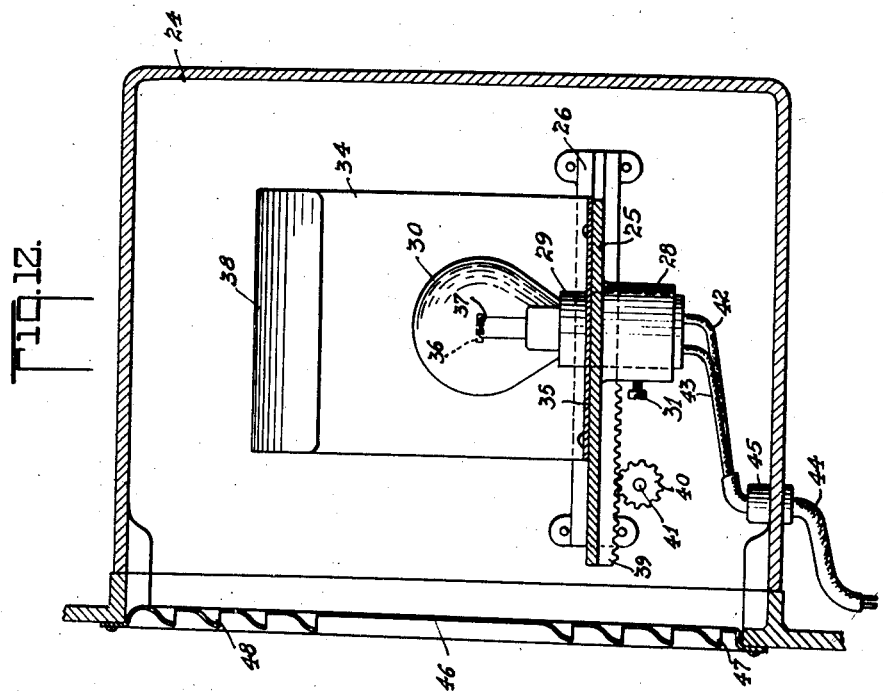
INVENTORS
VERNEUR E. PRATT
ZOLTAN TAKATS
BY
ATTORNEY

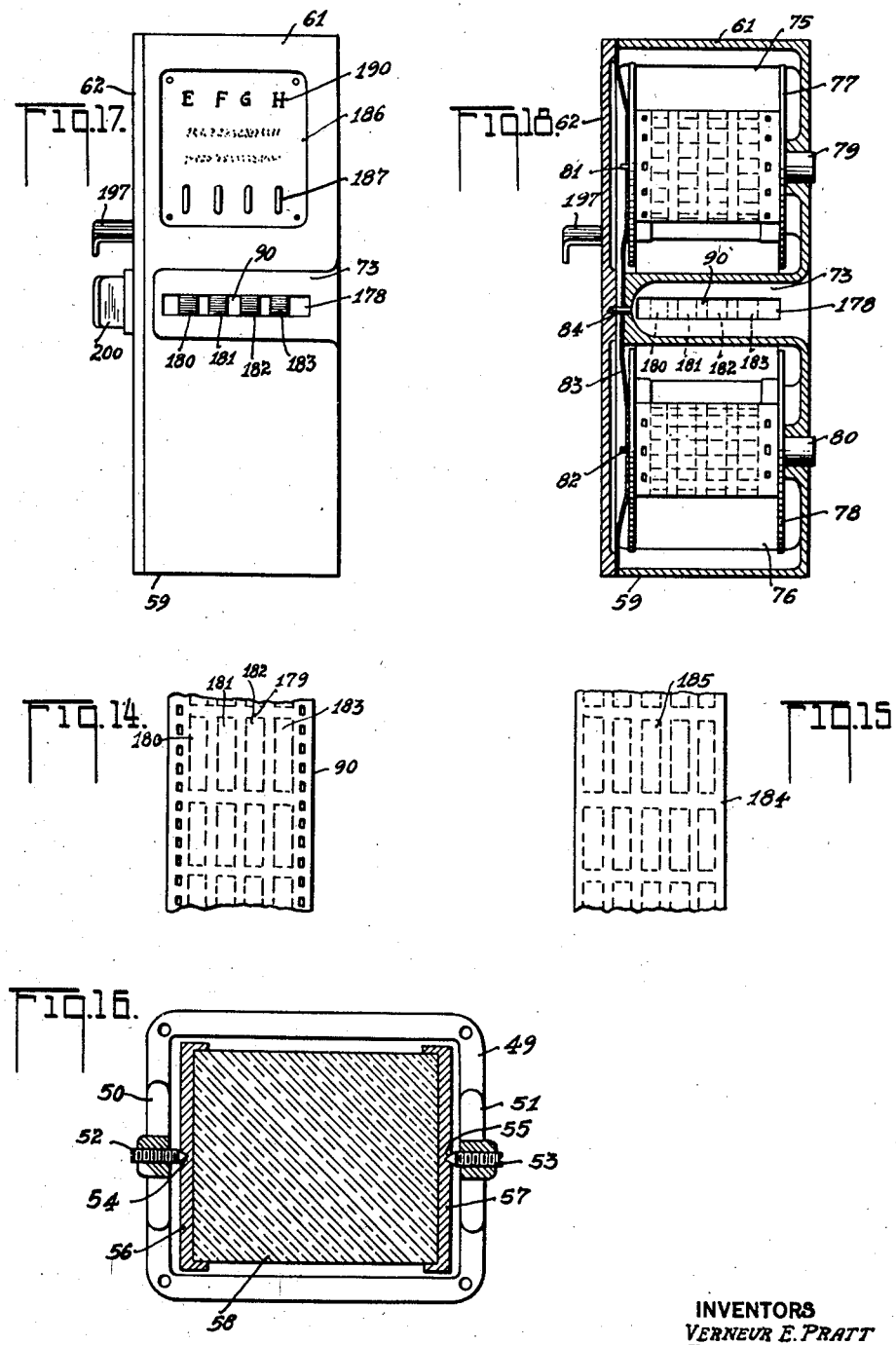

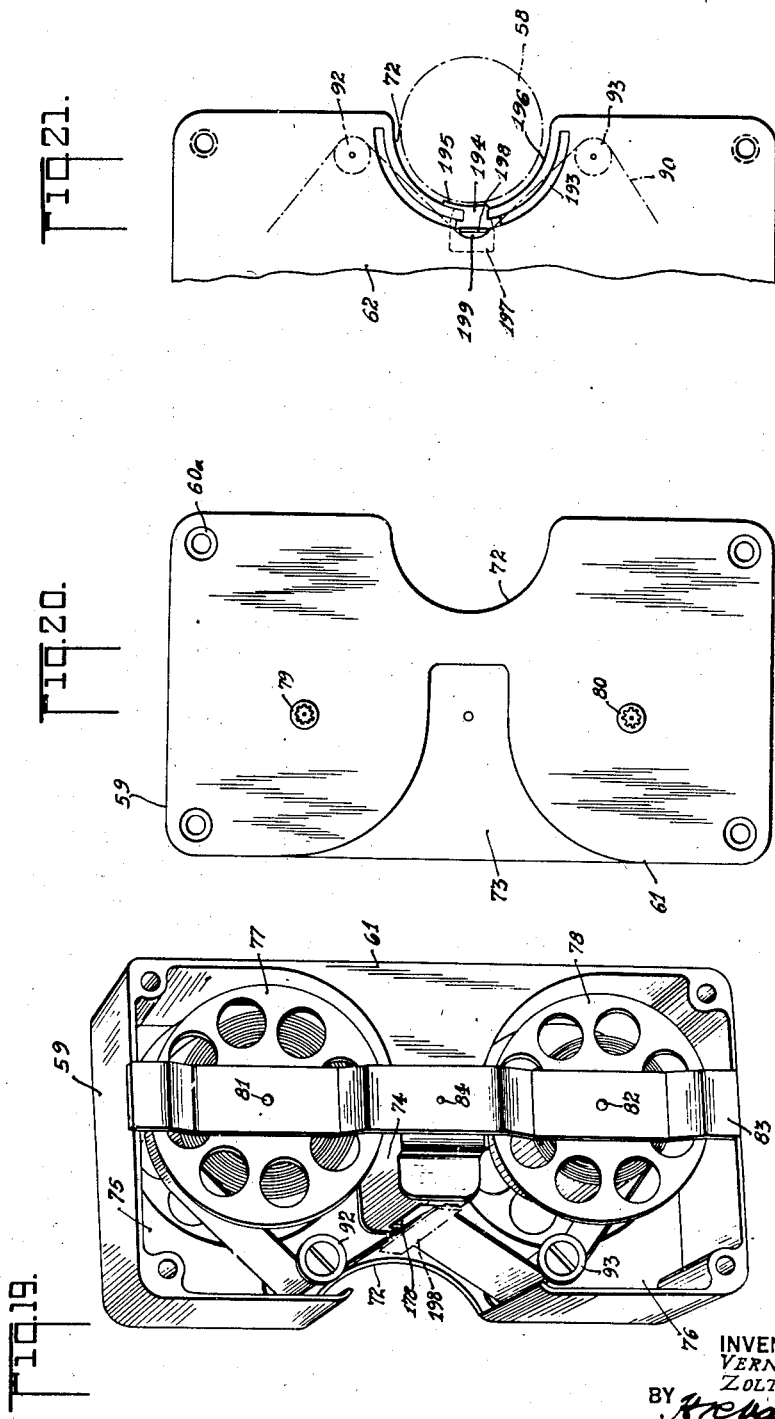

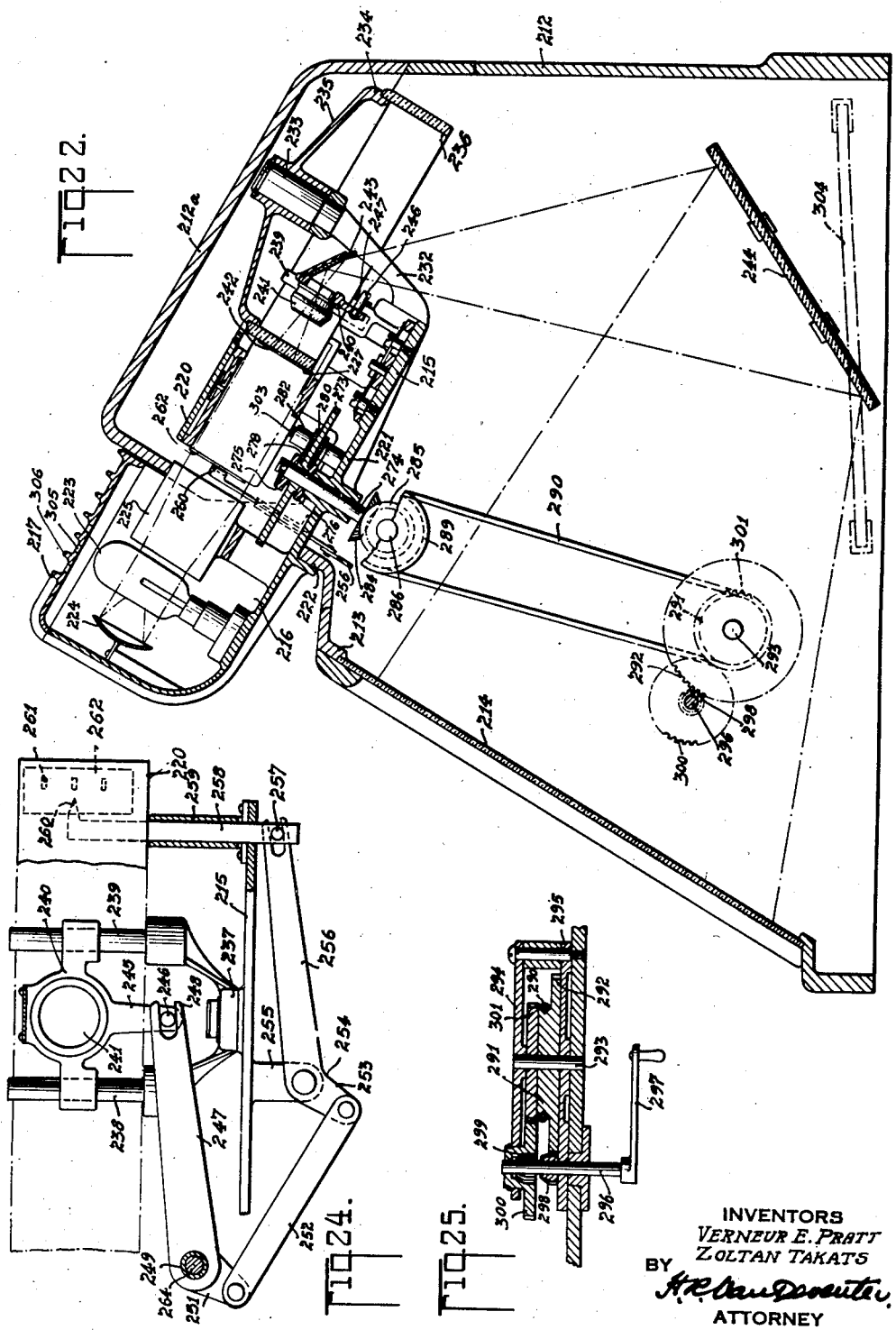

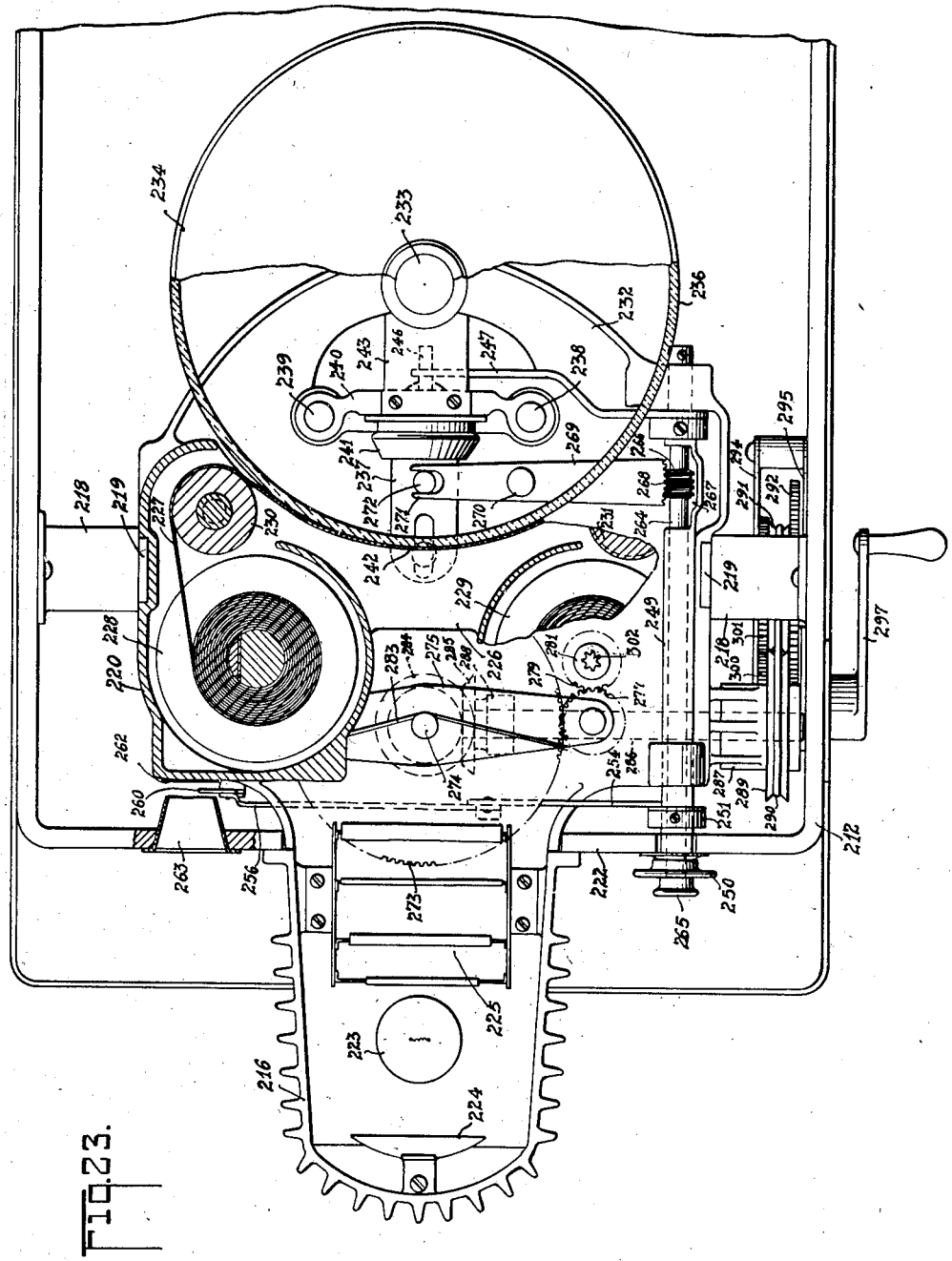

Patented Aug. 2, 1938

2,125,582

UNITED STATES PATENT OFFICE 2,125,582

PROJECTION DEVICE

Verneur E. Pratt, Stamford, Conn., and Zoltan Takats, Leonia, N. J., assignors, by mesne assignments, to Plant Liquidation Corporation, a corporation of New Jersey Application November 18, 1936, Serial No. 111,438

18 Claims. (Cl. 88—24)

This invention relates to projection devices.

The principal object of the invention is to provide suitable means to present reading matter, statistical data and the like in readily legible form by enlarged projection from a film.

Another object is to provide a device of the above character which is self contained and which gives a large magnification within a relatively small bulk.

A further object is to provide a device of the above type adapted to selectively present parallel columns or pages extending longitudinally on the film strip.

Another purpose is to provide a device of the above character including improved means for holding, inserting and removing the film.

Another object is to provide a device of the above character including means to employ film without sprocket perforations and to utilize the entire width of the film for projection.

Another object is to provide a device of the above character in which generation of heat by the light source and the effect of such heat are minimized.

A further object is to provide a device of the above character wherein the film is protected from abrasion, dust and other destructive influences.

A still further object is to provide a device of the above type having improved driving means including forward and reverse drive by a single handle, rapid and slow speeds, and protective release for the film.

Other objects and advantages will appear during the course of the following description in connection with the attached drawings, in which Figure 1 is a longitudinal view of one embodiment of the invention partly in section and with the side plate removed;

Figure 3 is a cross sectional view of the device, Figure 1;

Figure 4 is a front elevation of the same;

Figure 5 is a side elevation showing the control handle and ventilating means for the light source;

Figure 6 is a detail side view of the reversing drive gearing in position to drive the lower film reel;

Figure 7 is a similar view of the same in position to drive the upper reel;

Figure 8 is a fragmental cross sectional view of the same in low speed driving position;

Figure 9 is a detail end view of a driving hub, Figure 3;

Figure 10 is a side elevation of an alternative form of the driving gearing;

Figure 11 is a view of the same partly in vertical section;

Figure 12 is a cross sectional view of the lamp housing showing the light source and shifting means;

Figure 13 is a detail view of the lens carrier yoke and rail brackets;

Figure 14 shows a typical portion of perforated film;

Figure 15 is a similar view of a portion of unperforated film;

Figure 16 is a longitudinal sectional view of the cylindrical lens;

Figure 17 is a front end elevation of the film magazine;

Figure 18 is a front view of the same partly in section;

Figure 19 is a perspective view of the magazine with the cover plate removed;

Figure 20 is a rear side elevation of the same;

Figure 21 is a fragmental rear view of the magazine cover plate showing the film retracting device;

Figure 22 is a vertical longitudinal view of an alternative form of the projector partly in section;

Figure 23 shows the same viewed from the top in part section and with the cover removed;

Figure 24 is a detail view showing the linkage of the column or page selecting and indicating means in the projector shown in Figures 22 and 23; and Figure 25 is a cross sectional detail view of the change speed gearing in the same.

Figure 1:
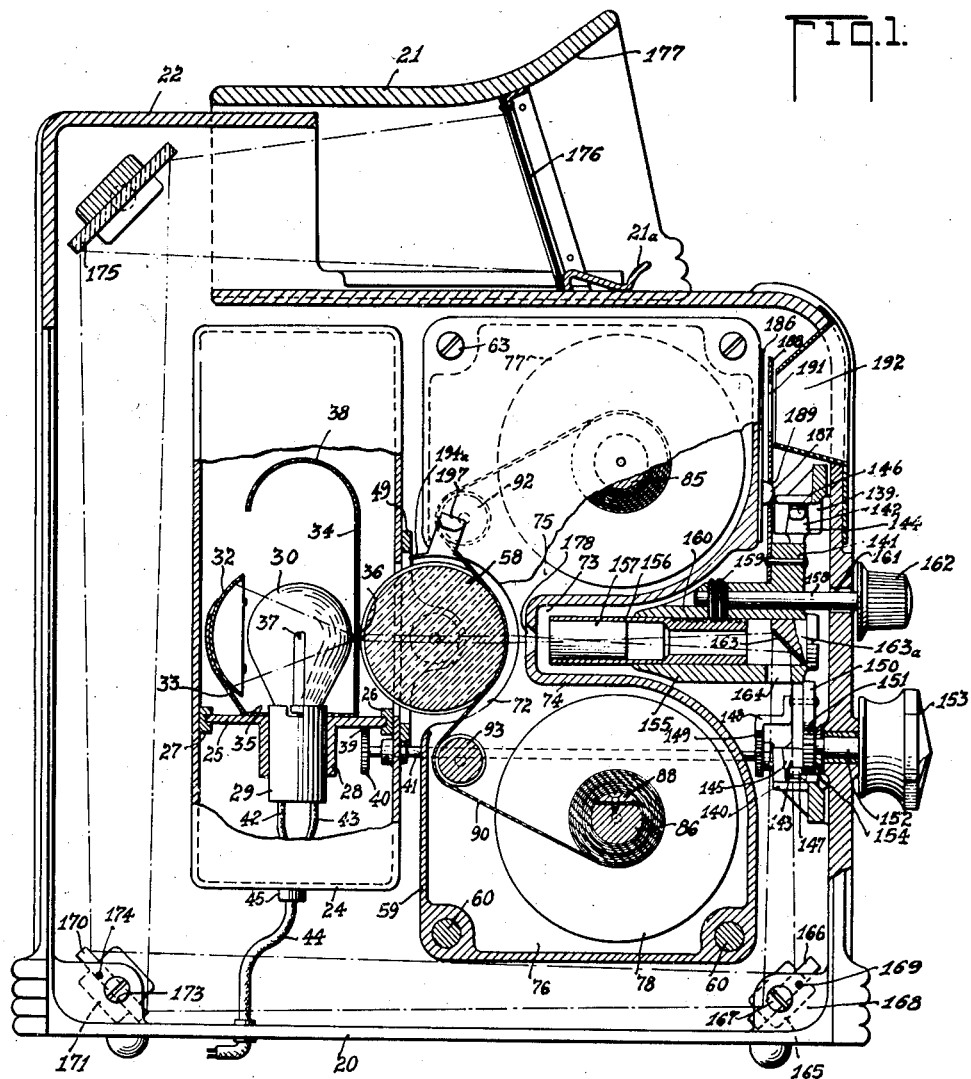

Referring to Figures 1, 3, 4 and 5, the numeral 20 indicates a casing to the top of which is slidably attached a screen hood 21 held in position by a locking spring 21a. The rear end of the hood 21 fits over an upward extension 22 of casing 20. Located inside the casing 20 and secured to the side wall 23 thereof is a lamp housing 24, shown in cross section in Figure 12. A horizontal plate 25 is slidable in grooved side rails 26 and 27 in the housing 24 and has formed thereon a sleeve 28 which carries a vertical lamp socket 29 holding a lamp 30.

A set screw 31 is provided in the sleeve 28 to allow for adjustable vertical setting of the socket and lamp.

A reflector 32 is secured to the plate 25 behind the lamp 30 by means of a bracket 33 as shown in Figure 1.

An upright shield 34, which may advantageously be formed as a continuation of the foot 35 of bracket 33, is mounted close to the front of lamp 30 and has a rectangular light slot 36 in line with the lamp filament 37. The upper end 38 of the shield 34 is curved back to form a semi-circular arc overlying the lamp 30, as shown in Figure 1.

A rack 39 on the bottom of plate 25 meshes with a pinion 40 on a shaft 41 journalled in the housing 24. The rack and pinion described provide means of sliding the plate 25 in the rails 26 and 27 to shift the entire lamp, shield and reflector assembly laterally when the shaft 41 is revolved in a manner hereinafter described. Flexible leads 42 and 43 connect the socket 29 with a current supply cord 44 through an insulating bushing 45 in the bottom of the housing 25.

Secured to the outside of the wall 23 and forming a closure for the housing 24 is a plate 46 having lower and upper ventilating louvres 47 and 48 shown in Figures 5, 12 but omitted from Figure 1 in order to avoid confusing this view.

A bracket 49 is secured to the front of the lamp housing 24 as shown in Figures 1 and 16. The bracket 49 has two trunnion extensions 50 and 51 carrying inwardly directed tapered pivots 52 and 53 engaging central bearing sockets 54 and 55 in end caps 56 and 57 on a cylindrical lens 58. The pivots 52 and 53 may be threaded into the extensions 51 and 50 allowing accurate adjustment to permit the lens 58 to revolve freely but without wobble.

A film magazine 59, shown in perspective detail in Figure 19, is mounted on locating pins 60, Figure 3, secured in the side wall 23. The magazine comprises a body 61 containing holes 60a for the pins 60 and to which a closure plate 62 is removably attached by any suitable means such as screws 63 in threaded holes 64. The locating pins 60 have forward tapered portions 65 which assist in guiding the magazine into place thereon, and headless set screws 66 are provided in the threaded holes 64 to engage the ends of the pins. Upon initial installation the set screws 66 may be adjusted to bring the magazine into proper registry with the other elements of the device. The magazine is held in place by a spring pressed plunger 67 slidable in a socket 68 secured to a side plate 69, the side plate being hinged at 70 to the casing 20 and normally held closed by a suitable latch 71.

The magazine 60 has in its rear side an arcuate depression 72 which embraces the revolving lens 58 with a narrow clearance. A cavity 73, formed in the body 59 and extending laterally throughout almost the total width thereof, has a wall 74 which divides the interior of the body 59 into upper and lower bays 75 and 76.

Film reels 77 and 78, disposed in the bays 75 and 76 respectively, have secured therein hollow inner pivots 79 and 80 rotatable in the body 61 and outer pivots 81 and 82 rotatably supported in a spring plate 83. The spring plate 83 is located vertically by means of a small pin 84 in the body 61 and is retained in place by the plate 62.

The hubs 85 and 86 of reels 77 and 78 carry film clamping means consisting of segments 87 and 88 separable from the main hubs and normally fastened thereto by means of screws 89, as shown in Figure 3. In placing a film 90 in the magazine the ends of the film are clamped between the segments and the hubs. Small aligning pins 91 engage the usual perforations in ordinary film, central holes being punched to accommodate the screws 89. When normally unperforated film is to be used in the machine, additional holes are punched for the pins 91. By the clamping means described, the ends of the film are held firmly and evenly throughout their entire width.

The spanning portion of the film 90 from reel to reel is led around rollers 92 and 93 adjacent the top and bottom of the depression 72 and in operation rides on the surface of the rotary lens 58.

Bosses 94 and 95 on the wall 23, Figure 3, have threaded therein screws 96 and 97 rotatably supporting upper and lower driving hubs generally denoted by the numerals 98 and 99 and carrying pinions 100 and 101, Figures 6 and 7. In Figures 5 and 6 the hubs are shown diagrammatically in order to clarify the description of the operation as hereinafter set forth.

As the driving hubs 98 and 99 are identical in structure, the upper hub 98 is broken away in Figure 3 to show the structure behind it, and the following internal description of the lower hub will be understood to apply also to the upper hub.

A sleeve 102, rotatably retained and guided on the cylindrical head 103 of the screw 97, has secured thereto the pinion 101 noted above. A flanged bushing 104 is secured in the end of the sleeve 102 and rotatably supports a pin 105 having an exterior flange 106 and a splined driving nose 107.

A compression spring 108, disposed between the bushing 104 and a cross pin 109 near the end of the pin 105, urges the flange 106 against a friction washer 106a between it and the bushing 104.

The splined noses 107 and 110 of the lower and upper driving hubs respectively engage the splined interiors of the hollow pivots 80 and 79 of the reels 78 and 77. The reels 78 and 77 are thus adapted to be driven by the hubs 99 and 98, the hollow pivots at the same time serving as pilots or bearing supports for the hubs.

A large boss 111 in the wall 23 has journalled therein a sleeve 112. Exterior and interior collars 113 and 114 secured to the sleeve 112 retain the latter in place longitudinally. A shaft 115, rotatably and slidably fitted in the sleeve 112, has secured to its outer end a crank member 116 provided with an internal taper 117 adapted to engage the tapered end 118 of the sleeve. The member 116 has a crank handle 119, and the hub 120 is shaped as a knob for making fine adjustments in a manner hereinafter described.

A small driving gear 121 is secured on a pilot 122 formed on the inner end of the shaft 115, and a second driving gear 123 of relatively large diameter is fastened on the inner end of the sleeve 112. Carrier plates 124 and 125, rotatably mounted on the sleeve 112 and pilot 122 respectively, are fastened together by upper and lower spacer pins 126 and 127, Figures 3 and 6. Wide-faced pinions 128 and 129 are rotatably mounted on the pins 126 and 127 respectively and are permanently in mesh with the large gear 123. Outer-transfer pinions 130 and 131, also in mesh with the wide-faced pinions 128 and 129, are mounted on pins 132 and 133 secured to the inner carrier plate 125. Inner transfer pinions 134 and 135, similarly pivoted to the plate 125, are in mesh with the outer transfer pinions 130 and 131 and are adapted to mesh with the small driving gear 121 when the shaft 115 is drawn outward to the right as shown in dot and dash lines, Figure 3, or as shown fully in Figure 8.

A leaf spring 136, Figures 3 and 8, is disposed between the carrier plate 124 and the large gear 123, urging the two apart and creating a light friction which tends to revolve the carrier as the gear is revolved.

The pinions 100 and 101 on driving hubs 98 and 99 are disposed in the same plane as the wide-faced pinions 128 and 129 and are adapted to selectively mesh with them. When the carrier plates are swung counter-clockwise, as shown in Figure 6, the pinion 129 moves into mesh with pinion 101. Similarly, if the plates are swung clockwise, the pinion 128 meshes with the pinion 100, as shown in Figure 7.

When the crank member 116 is in engagement with the tapered end of the sleeve 112 as shown in Figure 3 and is revolved, the sleeve 112 revolves the large gear 123 and the friction of the leaf spring 136 causes the carrier plates and their attached gears to move as a unit until one of the outer wide-faced gears is carried into mesh with either the upper pinion 100 or lower pinion 101, depending on the direction of rotation as explained above.

As the pinions fall into mesh the plates may be restrained from further rotation by one or the other of two adjustable stops 137 and 138 secured to the wall 23, so that further rotation of the handle causes the large gear to revolve between the plates, thereby driving the wide-faced pinion and through it the pinion 100 or 101 with which it is held in mesh. It will be understood, however, that stops 137 and 138 may be omitted where adjustability is not desired, in which case further unitary rotation is prevented by the hub pinions themselves.

By this means, the driving hub 98 and 99 is driven and in turn drives one of the reels 77 or 78. The direction in which either reel is driven is such as to wind the film on that reel, the friction of the spring plate 83, Figure 3, tending to restrain rotation of the other reel sufficiently to maintain the film taut in its passage over the rollers 92 and 93 and the revolving cylindrical lens 58. Revolving the crank member 116 in the reverse direction operates in the same way as described, driving the other reel and rewinding the film thereon.

Due to the relatively large diameter of the driving gear 123 with respect to the hub pinions 100 and 101, the action just described gives a rapid drive to the reels relative to the crank speed. When the crank member is pulled out to release the sleeve 112 and bring the small driving gear 121 into mesh with the inner transfer pinions 134 and 135, rotation of the crank member causes meshing of the driving device and rotation of the reels in the same manner as described above except that the drive takes place through the transfer gear trains, and due to the small diameter of the driving gear 121 the rotative speed imparted to the hub pinions and reels is relatively low.

During the low speed drive operation, the large gear 123 is driven by the wide-faced pinions 128 and 129, so that the leaf spring 136 is still effective in holding the device in driving mesh. The radial spacing of the driving hubs 98 and 99 from the center of shaft 115 may be made slightly longer than that of the pinions 128 and 129, so that the direction of driving torque between the meshed pinions tends to assist the action of the spring 136 in holding the device in mesh.

An optional form of the gearing assembly is shown in Figures 10 and 11. In this form a single pinion train comprises inner and outer transfer pinions 201 and 202, the latter in mesh with the upper wide-faced pinion 203. The inner transfer pinion 201 is adapted to mesh with the small driving gear 204. The large driving gear 205 is in mesh with both wide-faced pinions 203 and 203a and drives them as previously described when the device is in high speed driving position. When the low speed gearing is to be operated, the drive takes place through the single pinion train to the upper wide-faced pinion 203, from which the large gear 205 serves as transfer to transmit the rotation to the lower wide-faced pinion 203a. The leaf spring 136 is omitted and a torsion spring 206, wound in a groove 207 in the end of the shaft 208, is hooked around the upper and lower arms of the inner carrier plate 209.

The friction of the torsion spring 206 in groove 207 causes the assembly to revolve as a unit to bring the wide-faced pinions into mesh with their respective driving hub pinions. The spring 206 also exerts a longitudinal pressure on the shaft 208 tending to carry it to the right. This pressure is not sufficient to dislodge the taper in the crank member 116 from the sleeve 112 in high speed position, as shown in Figure 11, but serves to shift the small gear 204 into mesh with pinion 201 and hold it there when the taper has been released by the operator.

Secured to the inside of the front of the casing 20 are upper and lower rails 139 and 140 shown in Figures 1 and 13. A yoke member 141 has upper and lower tapered shoes 142 and 143 slidable in V-grooves 144 and 145 in the rails 139 and 140. Leaf springs 146 and 147 secured to the shoes and riding in the bottom of the V-grooves 144 and 145 hold the shoes firmly in any location, also insuring smooth and steady sliding of the shoes and preventing looseness and vibration of the yoke 141.

A rack 148, secured to the rear side of the yoke 141, engages a pinion 149 on the shaft 41. A second rack 150, secured to the front of the yoke 141, engages a pinion 151 on a short shaft 152 journalled in the front of the casing 20 and carrying an exterior adjusting knob 153. A spring washer 154, disposed between the wall of the casing and the pinion 151, places a steadying friction on the latter during its rotation.

A sleeve 155, formed on the yoke 141, extends rearwardly into the cavity 73 in the film magazine 59. A lens barrel 156, containing a projection lens system 157, Figure 1, is slidably mounted in the sleeve 155 in line with a lateral light slot 178 in the wall 74. A shaft 158, journalled in the yoke, carries a worm 159 engaging a concave thread rack 160 cut in the top of the lens barrel. The shaft 158 projects outward through a lateral slot 161 in the front of the casing 20, as shown in Figures 1 and 4, and has fastened to its outer end a knob 162. By turning the knob 162, the worm 159 may be made to move the lens barrel 156 inward or outward, thus providing an accurate focusing adjustment.

A downwardly inclined mirror 163, Figure 1, is carried by a plug 163a secured in the yoke 141 in line with the lenses 157. The mirror 163 overlies an aperture 164 in the bottom of the sleeve 155. A lateral support 165, pivotally mounted in the lower front corner of the casing 20, has fastened thereto a rearwardly inclined second mirror 166 below the aperture 164 and first mirror 163. The outer pivot 167 of the support 164 is threaded in a lug 168 to allow accurate adjustment of the pivotal mounting. A clamping screw 169 is provided to lock the support 165 and hold the mirror 166 at any angle of inclination to which it may be adjusted.

A third inclined mirror 170 is mounted on a support 171 carried on tapered pivots 172 and 173 in the lower rear corner of the casing 20 as shown in Figures 1 and 3, a locking screw 174 being provided as already described. The third mirror is inclined upward toward a fourth mirror 175 which is adjustably pivoted in the rear corner of the upper extension 22 of the casing 20. The fourth mirror 175 is inclined forwardly toward a translucent screen 176 secured in the hood 21 near the flared front 177 thereof.

Figure 14 shows a typical strip of standard perforated film 90 having photographed thereon a series of images such as 179 which may show, for instance, successive pages of a telephone book, each page comprising a number of columns 180, 181, 182 and 183.

Figure 15 shows a similar strip of film 184 except that the latter contains no perforations and the photographed image 185 may be carried to the extreme edges of the film, thus utilizing the entire width of the latter.

When the film 90 is loaded in the reels 77 and 78 in the magazine 59, the film embraces the revolving lens 58, behind the light slot 178 in which small portions of the columns 180, 181, 182 and 183 are exposed as shown in Figures 17 and 18. Light from the filament 37 is concentrated by the reflector 32 and directed through the slot 36 in the shield 34 into the cylindrical lens 58. The lens 58 further concentrates the light in a flat beam to brightly illuminate a single line of a single column on the film. The image of the illuminated line is projected by the lens 157 against the first mirror 163 which reflects it downward through the aperture 164 against the second mirror 166. From the second mirror 166 the image is reflected horizontally to the third mirror 170, thence vertically to the fourth mirror 175, from which it is reflected to and brought to focus for observation on the translucent screen 176. In its circuit about the device, the image is highly magnified and being sharply focused by proper adjustment of the lens barrel 156, as previously described, is presented to the observer in large and readily legible form. The pivotal adjustability of the mirrors 166, 170 and 175 permits the image to be centered vertically on the screen, while the lateral angle of the first mirror 163 may be adjusted by turning its supporting plug 163a to center the image horizontally. Due to the accurate location of the magazine 59 by means of the locating pins 60 and screws 66, as previously described, an initial proper adjustment of the mirrors usually renders any subsequent adjustment unnecessary.

As stated above, the image thrown may comprise a single line of a single column. By turning the knob 153, thus revolving the pinion 151, the yoke 141 may be moved laterally in the v-grooves, carrying with it the projection lens assembly which moves in the cavity 73. The rack 148 revolves the pinion 149 and shaft 41. The pinion 40 in the lamp housing moves the rack 39, thus moving the plate 25 in the rails 26 and 27. The pinions 40 and 149 have the same pitch diameter, so that the above lateral movement causes the light source, projection lens system and first mirror 163 to shift together, the slit of light concentrated by the cylindrical lens traversing the slot 178 and successively illuminating the various columns on the film 90.

By the above described adjustment of the knob 153 the image of a line from any desired column may be projected on the screen 176.

To facilitate accurate location of the selected column and also to allow pre-selection of a desired column, the following provision is made:

A plate 186, Figures 1 and 17, is secured to the front of the magazine 69 in line with the film 90, and has formed thereon a series of forwardly protruding detents 187 spaced in line with the various columns on the film. A resilient tongue 188 is secured to the top of the yoke 141 and has a slot 189 adapted to individually engage the detents 187. As the yoke is traversed to select a column, the resilient tongue presses against the detents 187 and as any column is centered the slot 189 engages the corresponding detent, allowing the tongue to snap inward, thereby retaining the projection system accurately in registry with the column.

The plate 186 carries one or more rows of index figures or characters 190, Figure 17, corresponding to the columns and located above the corresponding detents, and the tongue 188 contains a vertical aperture 191 of single column width through which the index character denoting each column may be viewed when the device is registered with that column. A depressed window 192 in the casing 20 adjacent the slot 191 makes the column indicating character readily visible to the observer through the front of the device.

The plate 186 on any individual magazine 59 is properly related to the particular film contained therein, and in addition to the column indicia may carry the title of the film and any other desired data.

In case a film is used having a greater number of columns than the four illustrated in Figures 14, 17 and 18, as for instance when the entire width of unperforated film 184 is utilized as shown in Figure 15, the plate 186 carries a correspondingly greater number of detents. Similarly, if the film carries only one, two or three columns a like number of detents and indicia are provided on the plate to indicate and locate the columns in the manner described.

In locating the data it is desired to observe, the page may be quickly brought to register by pushing the crank member 116 in, as shown in full lines in Figure 3, turning the crank to operate the rapid film drive as previously described, in whichever direction is necessary. The page having thus been rapidly brought to approximate registry, the column may be selected by means of the knob 153. The crank member is then pulled outward to throw the slow speed gearing into mesh and the knob-shaped hub 120 revolved to bring the desired line into accurate registry by means of the fine feed.

To remove the magazine from the casing 20, the latch 71 is disengaged and the side plate 69 swung open, the plunger 67 releasing the magazine 59, after which the magazine is withdrawn from the locating pins 60. In removing or inserting the magazine, however, it is necessary that the film 90 be held clear of the revolving lens assembly.

For this purpose, the following provision is made:

An arc-shaped groove 193, shown in Figure 21, is located in the inner side of the cover plate 62 of the film magazine 60 adjacent and parallel to the edge of the arcuate depression 72. A runner 194, fitting around the edge of the cover 62, has an inner guide tongue 195 sprung into the groove 193, a curved strip 194a engaging the curved edge 196 of the cover 62, and an outer finger grip 197. The runner 194 carries a cross bar 198 spanning the film 90 and having a pad 199 of felt or other suitable fabric adapted to engage the outer surface of the film.

When the runner 194 is swung my means of the external grip 197, to the mid-position, the padded bar 198 retracts the film as shown in Figures 19 and 21. In this position, the film 90 is held completely behind the edges of the arcuate depression 72 so as to clear the cylindrical lens assembly as the magazine 60 is removed from or inserted in the casing 20. When the magazine has been pushed into place on the guide pins 60, the runner 194 is swung to the upper position shown in Figure 1, in which position the padded cross bar 198 is clear of the film when the latter is drawn taut. The first operation of the feeding device draws the film taut into engagement with the cylindrical lens 58.

When in its central position, the finger grip 197 interferes with the plunger 67 on the side plate 69, preventing the latter from being closed. This provision avoids the possibility of the operator closing and attempting to operate the device without releasing the bar 198 from the film. Similarly, in operating position, the curved strip 194a projects into the opening in the lens bracket 49, as shown in Figure 1, preventing an attempt to withdraw the magazine without retracting the film. A second finger grip 200, Figure 17, secured to the cover plate 62, is cooperative with the movable grip 197 when the latter is in central position, to facilitate handling the magazine.

Figure 2:
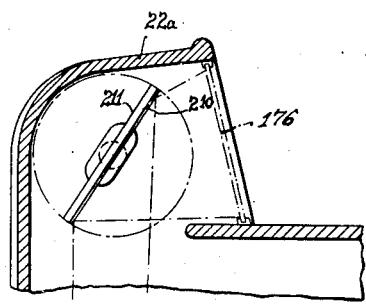
Figure 2 is a fragmental view showing a modification of the screen arrangement.

If desired, the hood 21 may be omitted and the screen 176 mounted directly in the upward extension of the casing 20, in which case the extension may be shaped as shown at 22a, Figure 2. Also, if desired, the mirror 210, Figure 2, may have its reverse surface 211 coated to act as an opaque screen. When the latter opaque screen is to be used the mirror 210 is revolved on its pivots and the translucent screen removed. The image may then be viewed directly on the opaque surface in foreshortened relation, the length of the path of projection from the lens being sufficient to prevent any portion of the image falling sufficiently out of focus to impair its legibility.

When it is desired to use the device, the operator selects the magazine or film book containing the desired information as indicated on the plate 186. The side plate 69 is opened and the magazine inserted as a unit, the pins 60 guiding it accurately into place, after which the film is released from the retracting bar 198 as previously described and the side plate closed.

The proper column is selected by revolving the knob 153 until aperture 197 in the tongue 188 reveals the corresponding character on the plate 186. The light source having been connected to a source of current, the film may then be reeled rapidly upward or downward by means of the single crank 116, using the high speed drive ratio, until the film is brought approximately to the registry desired, after which the low speed ratio is used as a fine adjustment to bring the required data accurately into registered projection on the visual screen. The provision of the low speed feed ratio allows accurate registry to be made with ease, which provision is of great importance due to the microscopic size of the characters on the film in the case, for instance, of telephone directory data or the like.

It will be noted that the heat from the light source is conducted out of the side of the casing through the upper louvers 48, the shield 34 absorbing the greater part of the heat and delivering it to air stream admitted through the lower louvers 47. Thus the entire path of projection is substantially clear of heat from the light source, avoiding distortion and fluctuation of the image due to atmospheric heat waves, a quality of importance in the projection of microscopic print and the like, especially in the earlier stages of projection which in the present invention lie ahead of and below the lamp housing.

By shifting the light source in synchronism with the projection lens, as previously described, it is made possible to concentrate the light on only the small area of film being projected, so that a relatively small lamp may be used with resultant saving in cost and small development of heat.

From the foregoing description it is obvious that the device comprises a compact and convenient reference projector adapted to give a large magnification within a small space. It is further obvious that the magazines for use therein constitute compact film books, each permanently containing its own film record and carrying externally the appropriate title and other data. The film is protected by the magazine closure from dust and injury, and no contact with the operator's fingers is necessary at any time. Furthermore, as the surface of the film in its motion in the projector is guided entirely by rolling contact, and as no sprockets are used for driving, the film is kept substantially free from wear, allowing its use over a long period of time.

The frictional torque release in the driving hubs 98 and 99, as previously noted, protects the film from rupture when entirely unwound from either reel. As each magazine carries its own detents 187 permanently located in line with the corresponding columns on the film contained therein, the proper registry of the column for projection is not dependent on any spacing provision in the projector itself, and different films may have different members of columns arranged in any desired spacing across their width, without altering in any way the ease and accuracy of the column selection in the projector.

The use of the single lever driving means, operable in either direction to wind the film on the proper reel while releasing the other, avoids inconvenience and the possibility of fouling or tangling the film such as may result when separate driving means are used for the two reels. The driving of the unwinding reel directly by the film itself also prevents any possibility of unwinding reel revolving at improper speed.

In the modified form of projector shown in Figures 22 and 23, the casing 212 has a rearwardly inclined front wall 213 in which is secured the translucent screen 214. A chassis or frame 215, having formed on its forward end a lamp housing 216 provided with a top cover 217, is secured in the casing 212 by means of brackets 218 having upwardly directed rails 219 which serve as locating guides for the film magazine 220 disposed thereon above the chassis and parallel to the bottom plate 221 thereof. A removable top closure plate 212a is provided in the casing 212.

The lamp housing 216 protrudes forwardly through a set-back portion 222 of the front wall and contains a lamp 223, a reflector 224 and a condensing lens system 225.

The magazine 220 is of substantially the construction already described except that the central opening 226 therethrough is large enough to allow light from the lamp 223 and condensing lens 225 to illuminate a longer extent of the film 227, on which images of complete pages of books or the like may be arranged with their vertical dimensions transversely of the film. The film 227 is premanently secured to reels 228 and 229 in the manner previously described, and runs over guide rollers 230 and 231.

A bracket 232 on the rear end of the chassis 215 carries an upwardly directed pin 233 on which is rotatably mounted a film guide or drum 234 comprising a head 235 and a cylindrical rim 236 of glass or other suitable transparent material adapted to engage and position the film 227 as shown in Figure 23, the film embracing the periphery of the rim 236 throughout a substantial arc.

A second bracket 237 slidably attached to the chassis 215 carries a pair of upright rods 238 and 239, extending into the drum 234. A yoke 240 shown in detail in Figure 24, is slidably mounted on the rods 238 and 239 and carries a projection lens 241 disposed in line with the area 242 of the film 227 which is in contact with the rim 236 and illuminated by the light source.

A downwardly inclined mirror 243 is attached to the bracket 240 in line with the lens 241. The lens 241 is adapted to receive an image from the illuminated area 242 of the film through the transparent rim 236, and to project the image against the mirror 243 which reflects it to a larger inclined mirror 244 secured in the lower part of the casing 212. The large mirror 244 in turn reflects the image to the screen 214 where it may be viewed by the reader.

The film may carry a number of images of pages arranged one above the other across its width. The yoke 240 has a downward extension 245 in which is secured a pin 246. An arm 247 having a forked end 248 engaging the pin 246, is secured to a sleeve or hollow shaft 249 journalled on the chassis 215 extending outward through the front of the casing 212 and carrying an external hand wheel 250. A second lever 251 attached to sleeve 249 is connected by a link 252 to one arm 253 of a bell crank 254 pivotally secured to a lug 255 on the chassis 215.

The second arm 255 of the bell crank 254 has a slotted end engaging a pin 257 in a flat member 258 which is slidably guided in a substantially vertical guide 259. The member 258 carries at its upper end a lateral pointer 260 adapted to indicate characters 261 on a plate 262 secured to the front of the magazine 220, as shown in Figure 23 and Figure 24.

By turning the hand wheel the sleeve 249 may be rocked, causing the arm 247 to move the yoke 240 upward or downward on the rods 238 and 239, thus moving the lens across the film 227. At the same time, the bell crank 254, actuated by the link 252 and lever 251, moves the pointer 260 to indicate the character 261 corresponding with the column or page on the film in registry with the lens 241. A window 263 in the front of the casing 212 permits the operator to observe the pointer and characters and thus select for projection the desired portion on the width of the film in substantially the manner previously described, except that due to the horizontal disposal of the film the selection is made in an upward and downward line instead of horizontally.

A shaft 264, journalled in the sleeve 249 and rotatable independently thereof by means of an exterior knob or button 265, carries a worm 266, the sleeve 249 being cut away at 267 to provide clearance. The worm 266 meshes with teeth 268 on one end of a lever 269 pivoted at 270 to the chassis 215, the other end 271 of the lever being forked to engage a pin 272 in the base of the bracket 237. By turning the button 265 the worm 266 may be made to swing the lever 269 and slide the bracket 237 on the chassis 215, thus providing focusing adjustment for the projection lens 241.

A large driving gear 273 is secured on a shaft 274 journalled in the chassis 215. Carrier plates 275 and 276, rotatably mounted on the shaft 274 above and below the gear 273, carry pinions 277 and 278, Figures 22 and 23, meshing with gear 273 and adapted to selectively mesh with pinions 279 and 280 on driving hubs 281 and 282 in the manner previously described in connection with Figures 6, 7 and 10, the torsion spring 283 being provided as in Figure 10 to generate the friction necessary to swing the carrier and pinions as a unit.

A bevel gear 284 on the lower end of shaft 274 meshes with a similar gear 285 on a horizontal shaft 286 journalled in downward extensions 287 and 288 of the chassis 215. A grooved pulley 289 on the outer end of shaft 286 is connected by a belt 290 to a second grooved pulley 291 formed integrally with a large gear 292, the latter being rotatably mounted on a pin 293 held by supports 294 and 295 secured thereto, as shown in detail in Figures 25 and 23. In Figure 22 the supports just mentioned are omitted and the rotative parts are shown diagrammatically in order to clarify the operation of the device. A shaft 296 slidably mounted in the supports 294 and 295, Figure 25, and extending outward through the side of casing 212, carries an external crank 297. A pinion 298, secured to the shaft 296, is adapted to mesh with the large gear 292 to drive the latter at greatly reduced speed when the crank 297 is revolved. When the shaft 296 is slid inward, the pinion 298 releases the large gear 292 and meshes with the splined interior 299 of a gear 300 rotatably retained by the support 294. The gear 300 is in mesh with a gear 301 secured to the pulley 291, thereby providing a second or higher speed drive for the latter. When the pulley 291 is revolved by the crank 297 through either the high or low gear ratio described, the belt 290, pulley 289, shaft 286 and bevel gear 285 and 284 transmit the motion to the shaft 274 and large gear 273 and its meshed pinions which selectively drive the hubs 281 and 282. The hubs have the splined noses 302 and 303 engaging the film reels in the manner previously described.

It will be seen that the operation of the driving device is substantially the same as described in connection with Figures 6, 7 and 10 except that the automatic reversing drive mechanism and the two-speed mechanism have been incorporated in two units and connected by the belt and bevel gear combination in order to give a convenient location to the operating crank.

In operation, the cover 212a of the casing 212 is removed and the film magazine inserted from above, after which the cover is replaced and the projector operated as previously described, the image from the film being projected in greatly enlarged dimension on the translucent screen 214. If desired, an opaque screen 304, Figure 22, may be used instead of the mirror 244, in which case the translucent screen 214 is removed and the image viewed directly in foreshortened relation on the opaque screen.

The lamp housing 216 and its cover 217 are ribbed in order to radiate heat, and ventilating holes 305, Figure 22, are disposed in the cover between the ribs 306, the latter ribs preventing light from shining forwardly toward the observer.

By removing the belt 290 and loosening the brackets 218, the chassis 215 with its attached parts may be removed as a unit from the casing 212, thus providing a complete projecting unit easily installed in different types and shapes of casings.

While the invention has been described in preferred form it is not limited to the exact structures illustrated, as various modifications may be made without departing from the scope of the appended claims.

What is claimed is:

1. In a projector, in combination, a casing, a light source adapted to project a beam of light in said casing, a removable unitary film magazine in said casing including a housing having aligned apertures therein through which said light beam may pass and including a film secured in said magazine in the path of said beam, a rotatable film guide engaging said film throughout the entire width thereof to position the same for projection, a projection lens positioned in the emergent beam from said film and adapted to receive an image therefrom through the aperture in said magazine and to project said image, a screen adapted to display a visual image disposed outside the optical axis of said lens and supported on said casing, and means in the emergent beam from said lens to reflect said image to said screen, the path of said projection passing under said light source.

2. In a projector including a main casing, a light source and an objective lens, a film magazine positioned in said main casing and comprising a secondary casing, having a passage extending therethrough to permit a beam of light to pass from said source to said lens, a pair of reels in said magazine, a film terminally secured to said reels and spanning said passage, means associated with said main casing and engaged by said reels when said magazine is positioned in said main casing for selectively driving said reels, whereby said film may be moved from either reel to the other, a transparent film guide positioned in said main casing in cooperative relation with said magazine and adapted to position said film whereby successive portions thereof may be illuminated by said light source, said guide having a contact surface engaging said portions throughout the entire width of said film, said magazine, reels and film being bodily removable as a unit from said main casing.

3. A projector as claimed in claim 2 wherein said transparent film guide is mounted in bearings supported in said main casing and freely rotatable therein whereby said film may rotate said guide by frictional contact therewith.

4. In a projector, in combination, a casing, a screen in said casing and visible from the exterior thereof, a film in said casing, a transparent rotatable film guide peripherally engaging said film throughout the entire width of said film, means to prevent axial movement of said guide, means including a projection lens to project an image within said casing from the portion of said film in contact with said transparent guide to said screen, means to move said film longitudinally, and means to shift said lens across said film.

5. A projector as claimed in claim 4 wherein the film has a plurality of columns of characters arranged side by side across the surface thereof, said lens has means connected thereto and extending outside said casing whereby said lens can be moved to register with said columns for individual projection therefrom.

6. In a projector, in combination, a casing, a screen in said casing and visible from the exterior thereof, a film in said casing, a rotatable cylindrical member of transparent material peripherally engaging said film whereby said film may be supported by said material throughout the entire width of said film, means to prevent axial movement of said cylindrical member, a projection lens in said casing and adapted to project an image from an area of said film in contact with said cylindrical member to said screen, the lateral extent of said area comprising a fraction of the width of said film, a light source adapted to illuminate said area, and common means to shift said lens and said light source laterally of said film.

7. In a projector, in combination, a main casing, a movable film in said casing, a laterally movable support in said casing, a projection lens mounted on said support adapted to project an image from an area of said film, the lateral extent of said area comprising a fraction of the width of said film, a projection aperture, a rotatable cylindrical lens engaging said film to position the same at the said projection aperture, a laterally movable support, a light source on said support in said main casing adapted to illuminate said film area through said cylindrical lens at said aperture, and common means including a shaft extending outside said main casing and connected to said supports to move the same and thereby shift said projection lens and light source thereon together laterally of said film to project different columns on said film upon a screen.

8. The combination claimed in claim 7 including means including reels engaging said film and a shaft connected to one of said reels and extending outside said main casing to move said film longitudinally, said cylindrical lens being rotatable by said film.

9. In a projector, in combination, a casing, a film in said casing, a transparent cylindrical film guide frictionally engaged by and adapted to be rotated by said film, means in said casing for moving said film, a projection aperture in said casing, a light source adapted to illuminate an area of said film in line with said projection aperture, a projection lens adapted to project an image from said area, a mirror in line with said lens and adapted to reflect said image downward, said mirror being rotatably adjustable about the optical axis of said projection lens, the distance between said film guide and said mirror being fixed, a second mirror adapted to reflect said image rearwardly in said casing, a third mirror in the rear of said casing and adapted to reflect said image upwardly, a fourth mirror adapted to reflect said image forwardly, and a translucent screen adapted to receive said image from said fourth mirror.

10. In a projector, in combination, a casing, a projection aperture formed in said casing, a film in said casing, means to move said film longitudinally across the projection light beam at said aperture, said film being imperforate throughout the effective length thereof, a projection lens adapted to project an image from an area of said film, the lateral extent of said area comprising a fraction of the width of said film, a rotatable cylindrical lens engaging said film to guide the same across the said projection aperture, a light source adapted to illuminate said film area of the projection aperture, through said cylindrical lens, and common means extending to the exterior of said casing to shift said projection lens and light source laterally of said film whereby the location thereon of said area for projection may be selected, the rage of selection of said area comprising substantially the entire width of said film.

11. In a projector, in combination, a main casing, a visual screen in said casing, a film magazine with aligned apertures therethrough in said casing including a casing and reels therein, a film in said magazine connected to said reels, said film having a plurality of columns of data in spaced relation across the width thereof and movable across said apertures, means including a light source and a projection lens in optical alignment with said apertures to conjointly selectively project an image from each of said columns to said screen, the light from said source passing through apertures of said magazine casing and the film therein, manual means operable from the exterior of said casing to pre-select the column for projection, means visible from the exterior of said casing to indicate said pre-selected column, and manually operable means on the exterior of said casing including a single handle to drive said film longitudinally in either direction past said apertures in said casing.

12. A projector as claimed in claim 11 wherein said indicating means includes indicia on said magazine casing indicating the corresponding order to said columns on said film.

13. A projector as claimed in claim 11 wherein said magazine casing and said film are removable from said casing as a unit.

14. A projector as claimed in claim 11 wherein said driving means includes a change speed device selectively operable by said handle to drive said film in said magazine at either of two different speed ratios.

15. In a projector, in combination, a substantially dust-tight casing, a film magazine in said casing, a pair of reels in said magazine, a film wound on said reels and terminally attached thereto, a transparent film guide in said casing and cooperative with said magazine to position said film, said magazine, reels and film being adapted to be unitarily removed from and inserted in said casing, a pair of driving hubs in said casing and adapted to be engaged by said reels upon insertion of said magazine, means to selectively drive said hubs in opposite directions whereby said film may be moved, and means to hold said film clear of said guide during insertion and removal of said magazine whereby manual contact with said film may be avoided.

16. In a projector, in combination, a substantially dust-tight casing, a translucent screen forming a part of a wall of said casing, a removable film magazine having aligned apertures therethrough and positioned in said casing, a film in said magazine, said magazine and film being removable as a unit from said casing, a light source in said casing and adapted to illuminate an area on said film through said aligned apertures, means to project an image from said area throughout an angular path through said apertures within said casing to said screen whereby said image may be substantially enlarged, the light from said source passing through said magazine, and ventilating means to remove heat from said light source, the path of said removed heat being clear of said path of projection whereby distortion of said image may be avoided.

17. In a projector, in combination, a casing having an inclined front wall, a translucent screen in said wall, a lamp housing above said screen, a lamp in said housing, a film magazine in said casing, said magazine including an apertured casing whereby the beam of light may pass therethrough to illuminate the film therein, a film in said magazine, a hollow cylindrical film guide in said casing and cooperative with said magazine to position said film, said guide having a transparent circumferential rim engaging said film throughout the width thereof and said guide being rotatable thereby, a condensing lens, said lamp and condensing lens being cooperative to illuminate an area of said film through said magazine, a projection lens disposed within said guide and adapted to project an image from said area, means to reflect said image to said screen, and means to move said film.

18. In a projector, in combination, a casing, a frame removably secured therein, a lamp housing on said frame and extending outside said casing, a film magazine removably mounted on said frame and containing a film, a transparent film guide rotatably mounted on said frame and cooperative with said magazine to position said film through said magazine, a light source in said housing and adapted to illuminate an area of said film, and means attached to said frame to project an image from said area, said frame, housing, light source, magazine, film guide and projecting means being removable as a unit from said casing.

VERNEUR E. PRATT.
ZOLTAN TAKATS.